United States Patent [19]

Hoffmann et al.

[11] Patent Number: 4,866,846
[45] Date of Patent: Sep. 19, 1989

[54] CUTTERHEAD FOR A VEGETATION CUTTER

[75] Inventors: Joachim Hoffmann, Aichwald; Josef Karner, Waiblingen; Dieter Angstenberger, Leutenbach; Gerhard Zerrer, Korb, all of Fed. Rep. of Germany

[73] Assignee: Andreas Stihl, Waiblingen, Fed. Rep. of Germany

[21] Appl. No.: 273,799

[22] Filed: Nov. 21, 1988

[30] Foreign Application Priority Data

Nov. 20, 1987 [DE] Fed. Rep. of Germany ....... 3739268

[51] Int. Cl.$^4$ .............................................. B26B 7/00
[52] U.S. Cl. ....................................... 30/276; 56/12.7
[58] Field of Search ................... 30/276, 347; 56/12.7, 56/295

[56] References Cited

U.S. PATENT DOCUMENTS

| 4,195,408 | 4/1980 | Palmieri et al. | 30/276 |
| 4,253,238 | 3/1981 | Sheldon | 30/276 |
| 4,259,782 | 4/1981 | Proulx | 30/276 |
| 4,347,666 | 9/1982 | Moone | 30/276 |
| 4,483,069 | 11/1984 | Moone | 30/276 |
| 4,651,421 | 3/1987 | Zerrer . | |

Primary Examiner—Frank T. Yost
Assistant Examiner—Willman Fridie, Jr.
Attorney, Agent, or Firm—Walter Ottesen

[57] ABSTRACT

The cutterhead includes a cutting filament wound on a spool and this cutting filament is adjusted with respect to its effective cutting length in dependence upon the rotational speed of the cutterhead. The switching point for the automatic feed must be precisely matched to the drive speed in order that the desired effective cutting length is maintained. In order to assure the desired effective cutting length, a spring is provided which is adjustable with respect to its biasing force by means of an easily accessible adjusting member. This biasing force is matched to the speed-dependent centrifugal force such that the spool is released at a predetermined speed of the cutterhead.

15 Claims, 6 Drawing Sheets

CUTTERHEAD FOR A VEGETATION CUTTER

FIELD OF THE INVENTION

The invention relates to a cutterhead for a motor-driven vegetation cutter which defines a drive axis about which the cutterhead is rotatably driven. The cutterhead includes a housing which is adapted to be rotated by the vegetation cutter about the drive axis and a spool which is journalled in the housing so as to be rotatable in increments and on which the cutting filament is wound. The cutterhead further includes an intermediate ring journalled in the housing and at least one pivotable coupling member which is subjected to centrifugal force and is in engagement with this intermediate ring. The coupling member blocks or releases the rotational movement of the spool in dependence upon the centrifugal force and a spring force which acts against the centrifugal force and with which the peripheral ring is biased in the direction of its periphery.

BACKGROUND OF THE INVENTION

U.S. Pat. No. 4,651,421 discloses such a cutterhead wherein the spring biasing force for two coupling members is applied by respective V-shaped springs which act directly on the coupling member corresponding thereto. To provide a trouble-free automatic adjustment of the cutting filament, the spool must be released at a very specific rotational speed of the cutterhead in order to unwind a portion of the cutting filament. The operational speed of the cutterhead is dependent upon motor capacity. The different vegetation cutters on which the cutterhead can be mounted can have different capacities which are dependent on the following: the standard capacity of the motor; the carburetor adjustment; age of the apparatus and normal wear of the vegetation cutting apparatus. Accordingly, the springs must be exchanged to provide an adaptation to the different conditions for which purpose the cutterhead must be disassembled. Such an exchange of springs is inconvenient and can not readily be performed by the operator of the apparatus especially as, in most instances, there is no suitable replacement spring available. The cutterhead must therefore be brought to a service center where it can be appropriately retrofitted.

SUMMARY OF THE INVENTION

It is an object of the invention to provide a cutterhead wherein the cutting filament feed can be subsequently and precisely adapted to different operating speeds of the cutterhead.

The cutterhead of the invention is for a motor-driven vegetation cutter defining a drive axis about which the cutterhead is rotatably driven. The cutterhead includes: a housing adapted to be rotatively driven by the vegetation cutter about the drive axis; a spool rotatably journalled in the housing for carrying a cutting filament wound thereon; and, indexing means for permitting an incremental rotation of the spool relative to the housing to pay out incremental lengths of the cutting filament in dependence upon centrifugal force; the indexing means including: an intermediate member movably journalled in the housing; an adjusting member mounted in the housing; resilient means interconnecting the adjusting member and the intermediate member for resiliently biasing the intermediate member in a first direction of rotation; coupling means releasably interconnecting the intermediate member and the spool and being pivotally mounted in the housing for pivotal movement in response to a predetermined centrifugal force sufficient to overcome the resilient biasing force of the resilient means, the coupling means being pivotally movable from a first position whereat the coupling means blocks the spool and then releases the latter for the incremental rotation with the movement of the coupling means to a second position whereat the coupling means again blocks the spool; the adjusting member being displaceably mounted in the housing for adjusting the resilient biasing force; and, access means for accessing the adjusting member for effecting a displacement of the adjusting member and an adjustment of the resilient biasing force.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
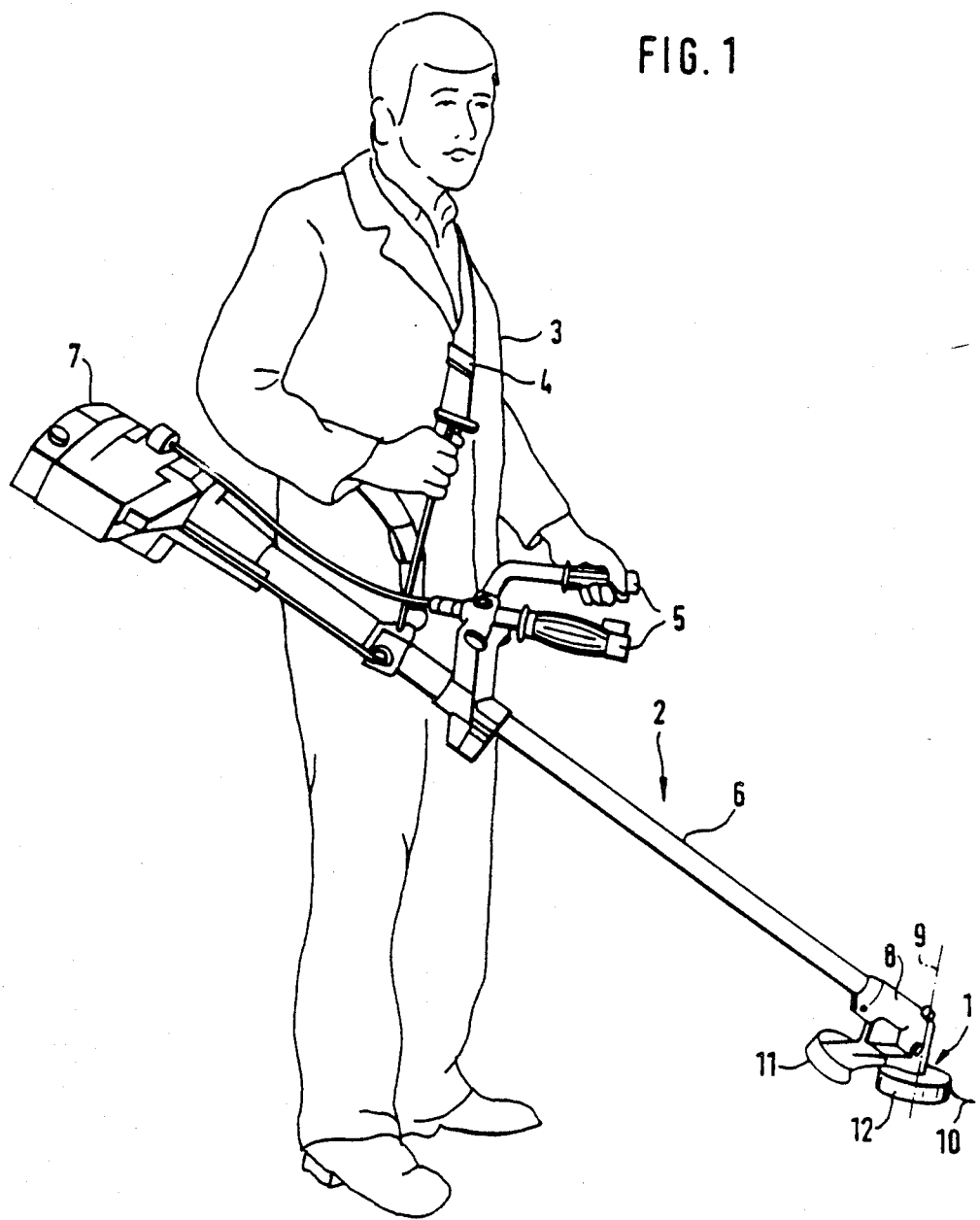
FIG. 1 shows an operator carrying a vegetation cutter equipped cutterhead according to the invention.

FIG. 1 shows a vegetation cutter 2 being carried by an operator 3 and equipped with a cutterhead 1. The apparatus is utilized, for example, for cutting grass and weeds. The vegetation cutter 2 is carried by the operator 3 by means of a shoulder belt 4 and is guided manually via handlebar-like holders 5 which are provided approximately at the center of the guide tube 6. A drive motor 7 is mounted at the upper end of the guide tube 6 and can be configured as an internal combustion engine. An angle-shaped connection piece 8 is mounted at the lower end of the guide tube 6 on which the cutterhead 1 configured as a component unit is mounted. The cutterhead 1 is rotatably driven about an axis 9 by the motor 7 via a drive connection disposed in the guide tube 6. The cutting element of the cutterhead is a cutting filament 10 which is wound on a spool within the cutterhead and exits from the cutterhead with one or two ends which become extended under centrifugal force when the motor is running.

A protective hood 11 can be provided on the connecting piece 8 to provide a shield against the cutting filament 10. The protective hood 11 can carry a cutoff device (not shown) for the cutting filament 10 the ends of which are thereby shortened to a predetermined length when these ends exit out of the cutterhead beyond the desired amount.

Figure 2:
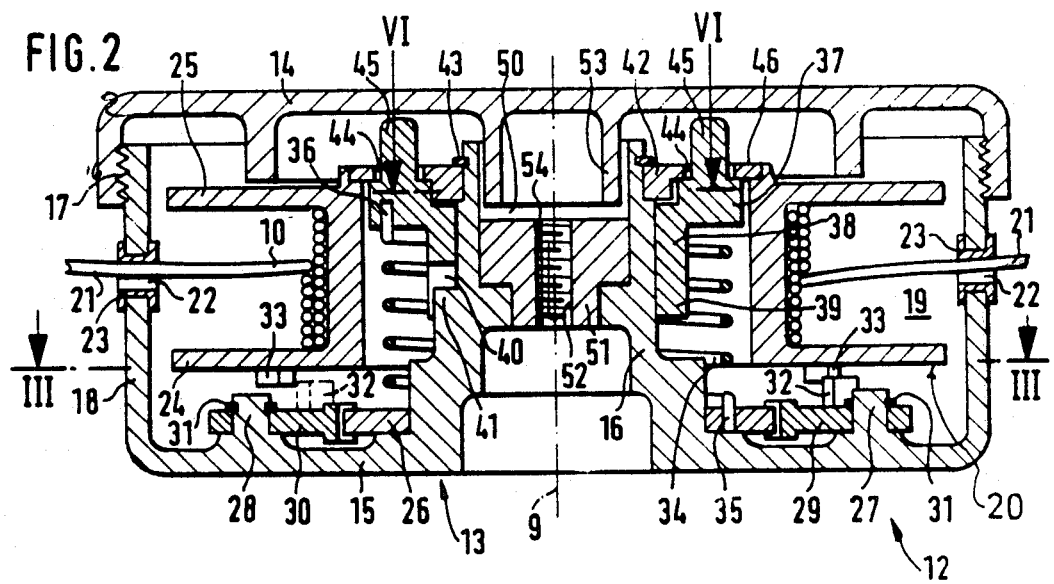
FIG. 2 is a side elevation view, enlarged and in section, of the FIG. 1.

As shown in FIG. 2, the cutterhead 1 includes a housing 12 which is essentially comprised of a base body 13 and a cover 14. The base body 13 is cup-shaped and configured with a cylindrical wall 18 and a base 15 having a central hub 16 formed thereon. The cover 14 lies parallel to the base 15 and threadably engages the wall 18 via an outer thread 17.

A spool 20 is rotatably journalled in the inner chamber 19 of the housing 12 and this spool is mounted so as to be coaxial with the rotational axis 9 of the cutterhead. The cutter filament 10 is wound on the spool 20 and can be configured as a plastic cord.

The cutting filament 10 has two free end portions 21 which are guided to the outside through pass-through openings 22 of two guide bushings 23 seated in the wall 18. The two guide bushings 23 lie diametrically opposite each other approximately in the center radial plane of the housing 12 and of the spool 20. The spool 20 has two end flanges 24 and 25.

An intermediate ring 26 is rotatably journalled at the periphery of the hub 16. The intermediate ring lies with one of its end faces in contact engagement with an elevated step of the base 15.

Two lugs 27 and 28 are formed on the base 15 and project inwardly into the inner space 19 of the base body 13. The pivot lugs 27 and 28 lie diametrically opposite each other. Two coupling members 29 and 30 are pivotally journalled on respective ones of pivot lugs 27 and 28 and each coupling member is secured against axial displacement by means of a holding ring 31 mounted on the lug.

Figure 3:
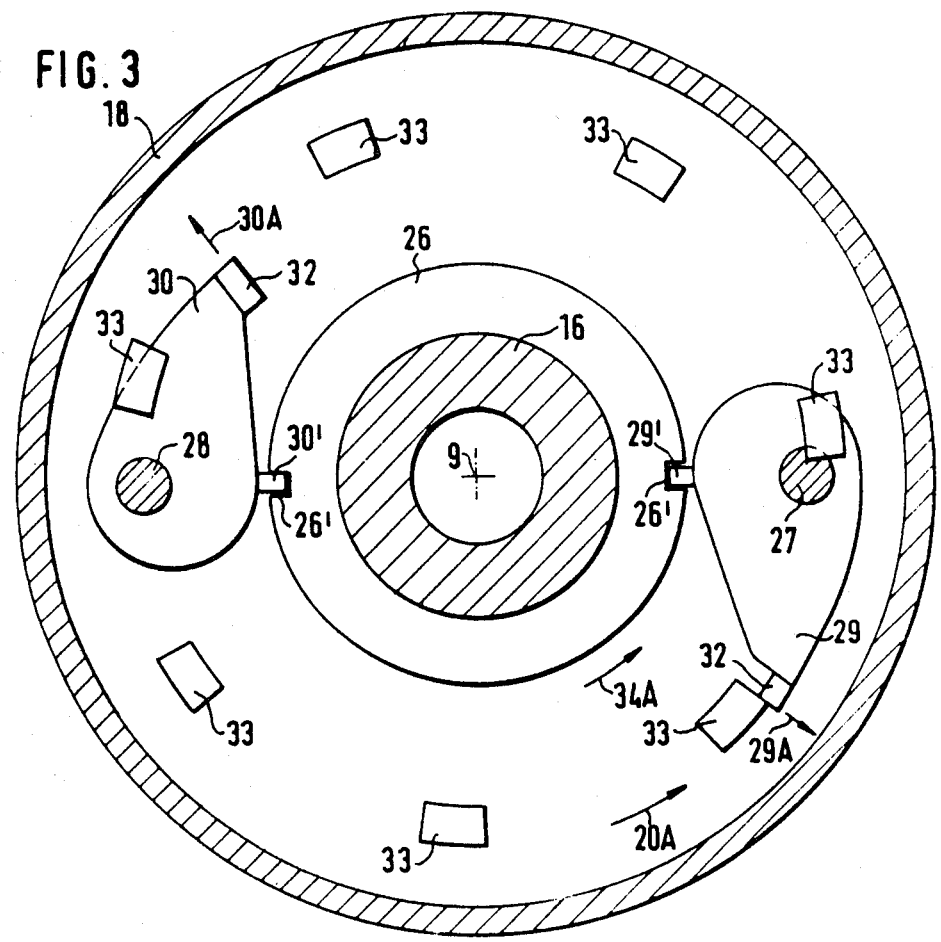
FIG. 3 is a section view taken along line III—III of FIG. 2.
Figure 4:
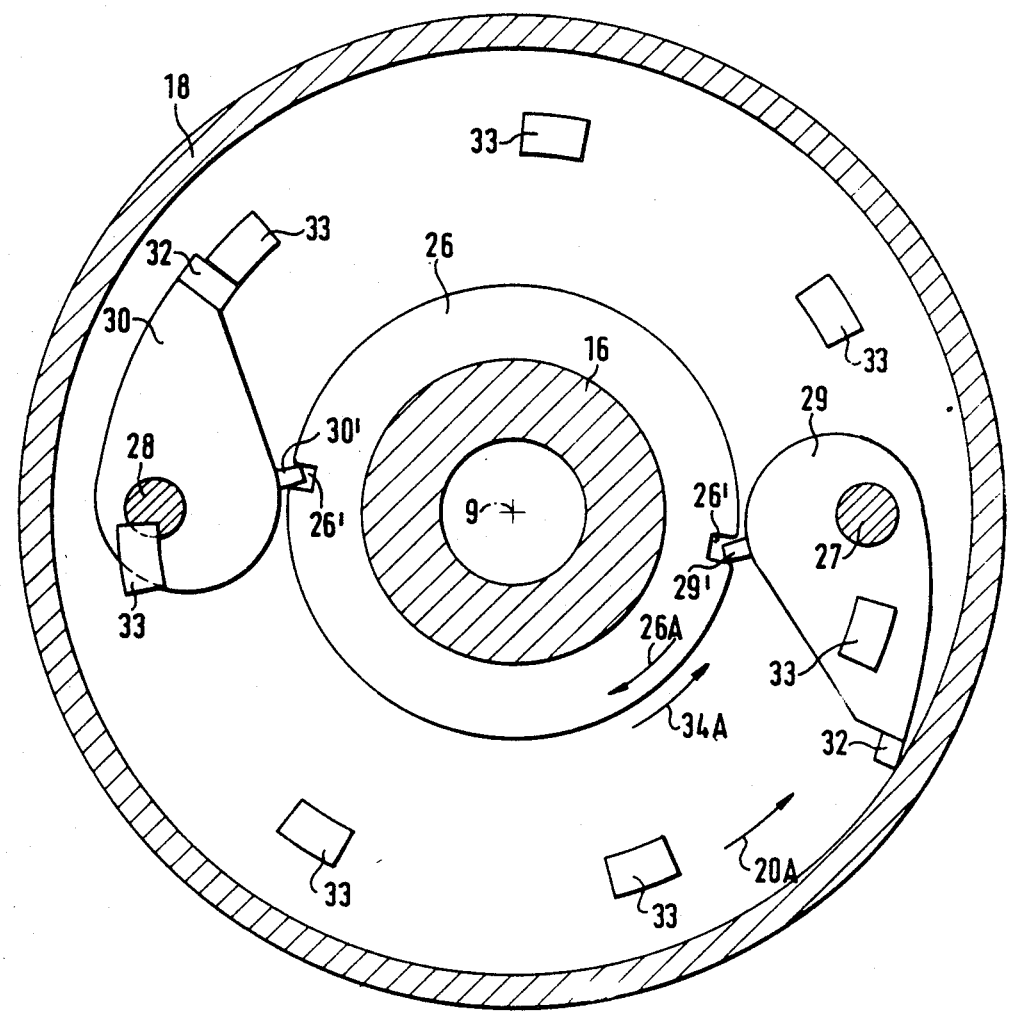
FIG. 4 is a view corresponding to that of FIG. 3 showing another position for the coupling members.

As shown in FIGS. 2, 3 and 4, the coupling members 29 and 30 have a pawl-like configuration and engage with respective projections 29' and 30' in corresponding peripheral recesses 26' of the intermediate ring 26. In this way, the coupling members are coupled in such a manner that with a pivot movement of one coupling member about its pivot lug caused by centrifugal force, also the other coupling member is pivoted synchronously in the same direction.

Each of the two coupling members 29 and 30 is provided with an abutment stop 32 corresponding to the cams 33 of the spool 20 which are provided as counter-abutments. The cams 33 are mounted on the outer side of the spool flange 24 and are arranged along a circle at equal spacings one from the other.

Figure 7:
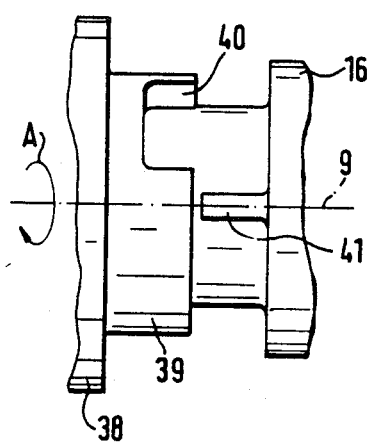
FIG. 7 is a schematic representation of a portion of the adjusting . and a portion of the hub of the cutterhead during assembly.
Figure 8:
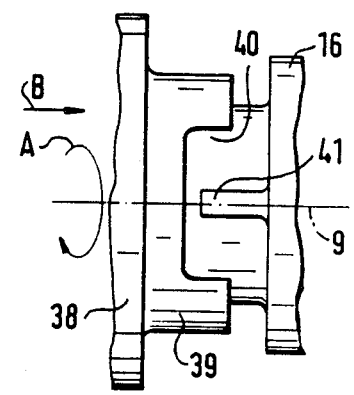
FIG. 8 is a schematic representation corresponding to FIG. 7 after assembly has been completed.

A helical spring 34 coaxial to the rotational axis 9 is mounted inside of the housing 12. The helical spring 34 surrounds the hub 16 and engages with one of its spring ends 35 in a bore of the intermediate ring 26. The other spring end 36 is fixed to an adjusting member 37 in a recess. The adjusting member is mounted at a spacing from the housing base 15 and is configured as a single piece with an adjusting sleeve 38 which is rotatably journalled on the hub 16. FIGS. 2, 7 and 8 show that the adjusting sleeve 38 has a cutout 40 on the portion 39 thereof facing toward the housing base 15 and in which a lug 41 engages during assembly which is formed on the periphery of the hub 16.

At the end of the hub 16 facing away from the housing base 15, a supporting ring 42 is mounted which is releasably attached by means of a holding part 43 configured as a circlip. The adjusting member 37 is pressed against the lower side of the supporting ring 42 by means of the pressure force of the helical spring 34. The spool 20 has a ring-shaped cutout at its upper end which opens inwardly and in which the supporting ring 42 is seated with an outer edge so that the supporting ring 42 lies on a shoulder of the spool 20 and its end face 46 is flush with the upper end face of the spool 20. The circlip 43 holds the supporting ring 42 and thereby holds the spool 20 against axial displacement.

The helical spring 34 acts on the intermediate ring 26 as a torsion spring since this spring is tensioned between the intermediate ring and the adjusting member 37. As shown in FIGS. 3 and 4, the intermediate ring 26 is biased by the helical spring 34 (not shown here) in the direction of arrow 34A and therefore lies with respective edges of its cutouts 26' on corresponding ones of projections 29' and 30' of respective coupling members 29 and 30 when the cutterhead is rotated at its normal operating rotational speed (FIG. 3). The speed increases when the ends 21 of the cutting filament 10 which are effective for cutting become shorter.

In this way, the centrifugal force acting on the coupling members 29 and 30 becomes greater. At a predetermined rotational speed, the centrifugal force overcomes the spring force acting in the direction 34A and the coupling members 29 and 30 pivot about their respective pivot lugs 27 and 28 in the directions of respective arrows 29A and 30A. This causes the stop 32 of the coupling member 29 to release cam 33 of the spool 20 which up till now has been lying in contact engagement with the stop 32. At the same time, the intermediate ring 26 is rotated in direction 26A against the spring force acting in the direction 34A by means of the tooth 29'. The pivot path of the coupling member 29 is limited by the housing wall 18 so that the tooth 29' can not disengage from out of the cutout 26'.

The coupling member 30 has the same pivot path as the coupling member 29 because both coupling members 29 and 30 are coupled via the intermediate ring 26. As soon as the cam 33 is released by the stop 32 of the coupling member 29, the spool 20 can rotate in the direction 20A since the centrifugal force acting on the cutting element applies a torque in direction 20A to the filament coil and therefore to the spool 20 itself. This rotational movement leads to an unwinding of the filament. The rotational movement is stopped by the stop 32 of the coupling member 30 as soon as the cam 33 engages the stop (FIG. 4) which is the cam lying nearest the coupling member 30. Since the ends of the cutting filament which are effective for cutting are now longer, the speed of the cutterhead becomes less and the force of the torsion spring 34 acting in direction 34A overcomes the centrifugal force so that the intermediate ring 26 is returned to its initial position (FIG. 3). In this way, the coupling members 29 and 30 are also returned to their initial positions and the stop 32 of the coupling member 30 releases the cam 33. The spool 20 can still rotate somewhat in direction 20A until it is again latched by abutment of the following cam 33 on the stop 32 of the coupling member 29.

The torsion force of helical spring 34 is adjustable in order to adapt the automatic feed of cutting filament 10 to the different operational conditions such as different motor capacities.

Figure 5:
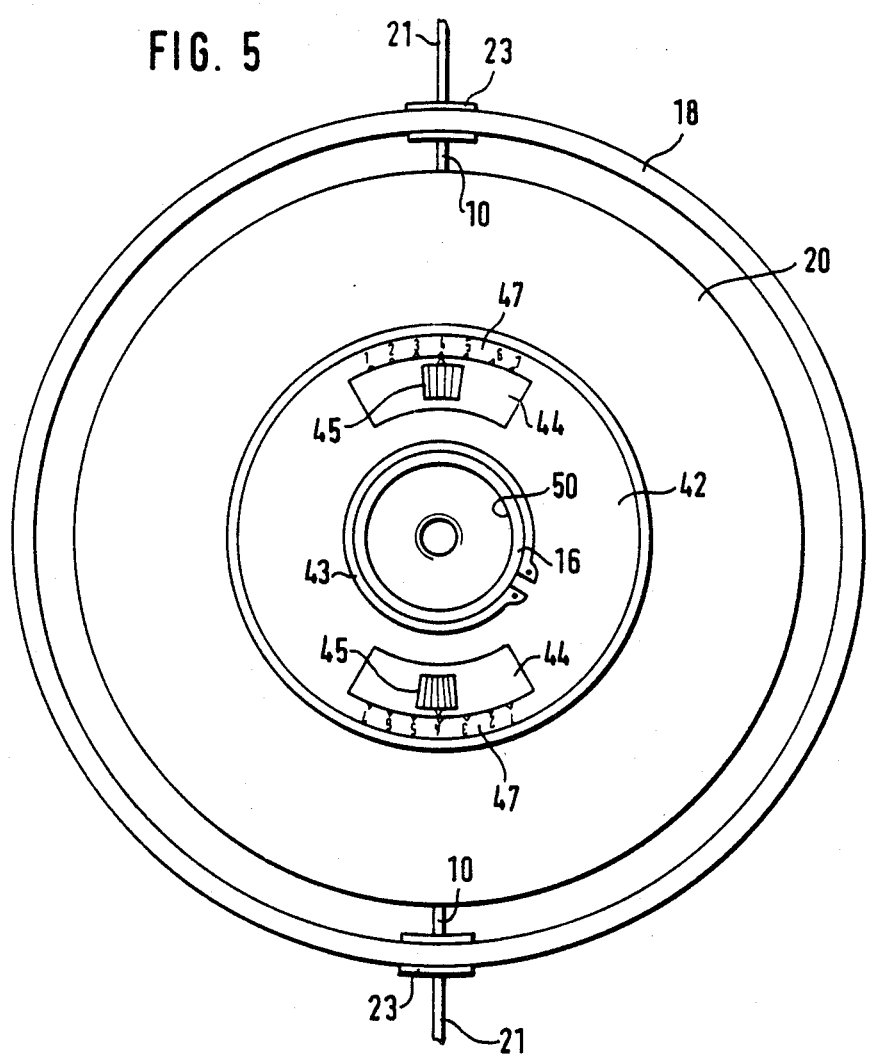
FIG. 5 is a plan view looking down on the cutterhead with the cover removed.

As shown in FIGS. 2 and 5, two elongated slots 44 are provided in supporting ring 42 and have the shape of segments of a circle and lie diametrically opposite each other. These slots 44 are penetrated by lug-like manipulators 45 which are configured as a single piece with the adjusting member 37. As shown in FIG. 5, an adjusting scale 47 is provided at the edge of each slot 44. The adjusting member 37 can be rotated about the axis 9 by means of the manipulators 45. The adjusting path is determined by the length of the slots 44 and the rotational position of the adjusting member 37 can be read off the scales 47. The torsion force of spring 34 acting on intermediate ring 26 can be changed by rotating the adjusting member 37 since the one end 36 of the spring 34 is fixedly attached on the adjusting member 37 and the other end 35 of spring 34 is fixedly attached on the intermediate ring 26. This adjustment of spring 34 can be performed in a simple manner for a cutterhead which has been completely assembled. For this purpose, it is only necessary to threadably disengage the cover 14 of the housing 12.

Figure 6:
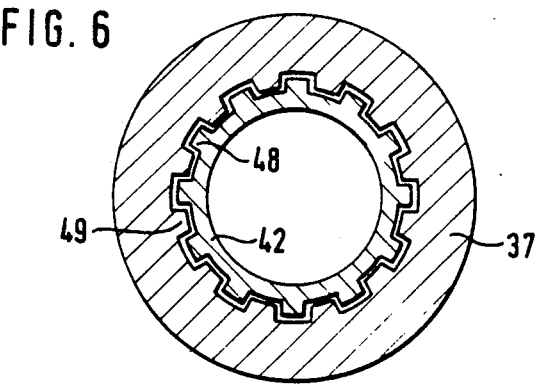
FIG. 6 is a view taken along line VI—VI of FIG. 2.

The adjusting member 37 is latched into each adjusted rotational position. For this latching, the adjusting member 37 is provided with an inner set of teeth 49 which interdigitally engage the outer teeth 48 of the supporting ring 42 under the pressure loading of the helical spring 34 as shown in FIG. 6.

This latching is released with an axial displacement of the adjusting member 37 against the pressure of spring 34. The adjusting member 37 can only then be rotated after it is axially displaced by means of the manipulators 45. With a subsequent rotation about the axis 9, the adjusting member 37 then latchingly engages with its toothed rim 48 again in the toothed rim 49 of the supporting ring 42 under the force of spring 34.

For attaching the cutterhead 1 to the vegetation cutting apparatus 2, an attachment nut 51 is seated in a central cylindrical recess 50 of hub 16. The attachment nut 51 has an internal thread and is kept as short as possible in order to keep its weight as low as possible and thereby also the total weight of the cutterhead 1. When the cutterhead 1 is attached, the attachment nut 51 is braced against axial displacement by means of a projection 53 disposed on cover 14 with this projection 53 extending approximately to the rearward end 54 of the nut 51.

Figure 9:
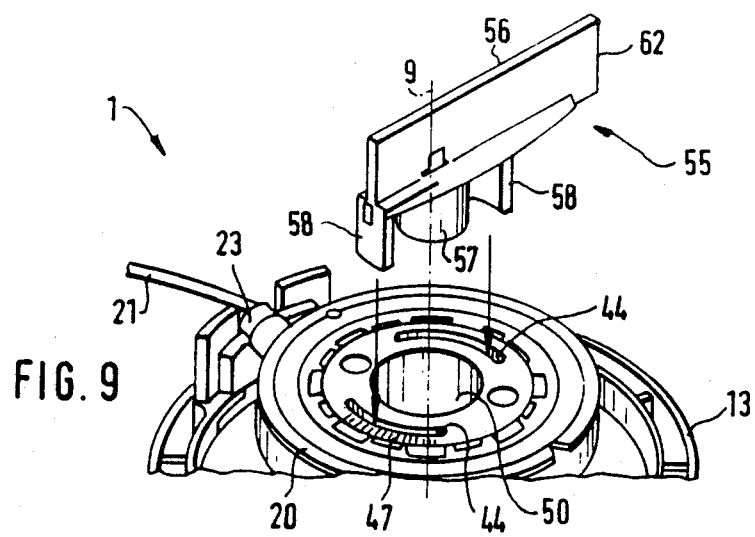
FIG. 9 is a partial perspective view of the cutterhead with the cover and showing a somewhat modified embodiment.
Figure 10:
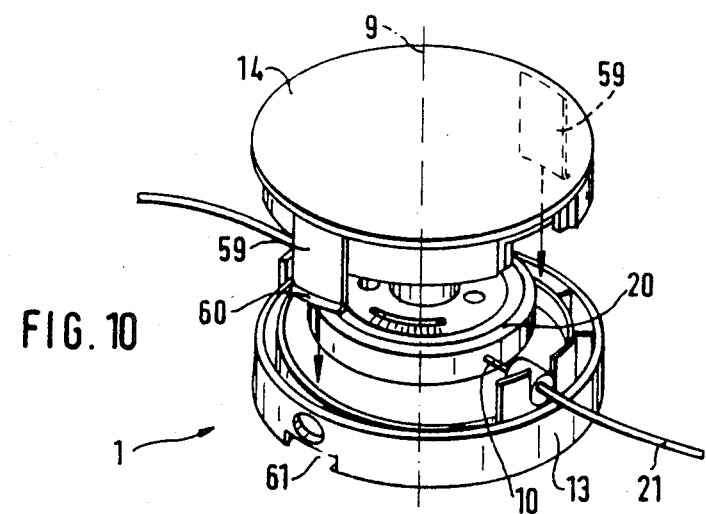
FIG. 10 is a perspective schematic of the cutterhead of FIG. 9 showing the cover in position ready for attachment to the housing o cutterhead; and, FIG. 11 a completely assembled cutterhead of FIGS. 9 and 10 ready operation.

FIGS. 7 to 9 show the cutterhead 1 in perspective representation during adjustment of the spring 34 and during assembly and disassembly. The illustrated cutterhead is somewhat modified with respect to the adjustment of the torsion force of the spring. A separate adjustment key 55 is provided for rotating the adjusting member 37 and includes a flat rectangularly-shaped handle portion 56. The tightening key has a cylindrical stub 57 for engaging the recess 50 of the hub 56. Furthermore, two prongs 58 are provided on the handle portion 56 of the adjustment key and lie diametrically opposite each other. These prongs 58 are passed through slots 44 of the supporting ring 42 and inserted into recesses of the adjusting member 37. These recesses are provided in lieu of the manipulators 44 and 45 shown in FIG. 2.

Figure 11:
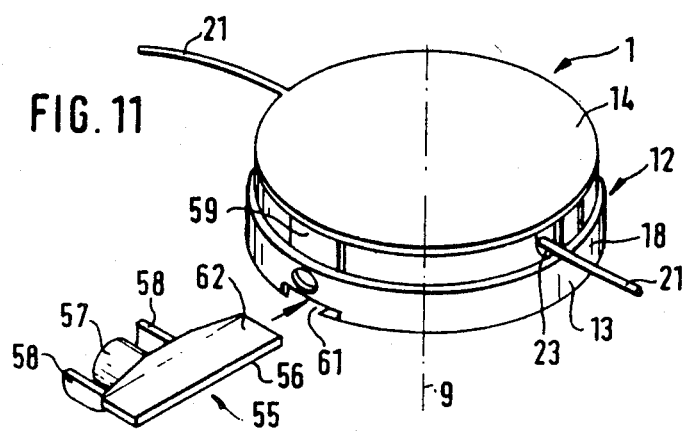

FIGS. 8 and 9 show that two diametrically opposite tongues 59 are configured on the periphery of the housing cover 14. These tongues 59 have latching protrusions 60 formed on their lower ends which engage in slot-like openings 61 formed in the base body 13. For separating the two housing portions 13 and 14, the end 62 of handle portion 56 can be inserted into the slot-like opening 61 to thereby press the tongue 59 back so that the latching protrusion 60 disengages and the cover 14 can be lifted off of the base body 14 as shown in FIG. 11.

For the factory adjustment of the cutterhead 1, the spring 34 is first inserted with its one spring end 35 into the intermediate ring 26 and then with the other spring end 36 into the adjusting member 37. As shown in FIGS. 7 and 8, the spring 34 is then pretensioned to a minimum value by means of a rotational movement of the adjusting member 37 in the direction of arrow A with the lug 41 entering into the region of the cutout 40 of hub 16. Thereafter, the adjusting member 37 is fixed in its predetermined functional position in that it is axially moved in the direction of arrow B with the lug 41 engaging the cutout 40. The rotational movement of the adjusting member 37 is then limited by the cutout 40. The tooth rims 48 and 49 come into form-tight engagement with each other when the supporting ring 42 is placed in position. The adjustment of the pretensioned spring 34 is limited by the slots 44 of the supporting ring 42.

It is understood that the foregoing description is that of the preferred embodiments of the invention and that various changes and modifications may be made thereto without departing from the spirit and scope of the invention as defined in the appended claims.

What is claimed is:

1. A cutterhead for a motor-driven vegetation cutter defining a drive axis about which the cutterhead is rotatably driven, the cutterhead comprising:

a housing adapted to be rotatively driven by the vegetation cutter about said drive axis;

a spool rotatably journalled in said housing for carrying a cutting filament wound thereon; and, indexing means for permitting an incremental rotation of said spool relative to said housing to pay out incremental lengths of the cutting filament in dependence upon centrifugal force; said indexing means including:

an intermediate member movably journalled in said housing;

an adjusting member mounted in said housing;

resilient means interconnecting said adjusting member and said intermediate member for resiliently biasing said intermediate member in a first direction of rotation;

coupling means releasably interconnecting said intermediate member and said spool and being pivotally mounted in said housing for pivotal movement in response to a predetermined centrifugal force sufficient to overcome the resilient biasing force of said resilient means, said coupling means being pivotally movable from a first position whereat said coupling means blocks said spool and then releases the latter for said incremental rotation with the movement of said coupling means to a second position whereat said coupling means again blocks said spool;

said adjusting member being displaceably mounted in said housing for adjusting said resilient biasing force; and, access means for accessing said adjusting member for effecting a displacement of said adjusting member and an adjustment of said resilient biasing force.

2. The cutterhead of claim 1, said intermediate member being an intermediate ring rotatably journalled in said housing; and, said resilient means being a spring torsionally pretensioned to develop said resilient biasing force; said spring having one end fixedly connected to said adjusting member and another end fixedly connected to said intermediate ring.

3. The cutterhead of claim 2, said intermediate ring being rotatably journalled in said housing so as to be coaxial to said drive axis and said spring being a helical spring mounted in said housing so as to be likewise coaxial to said drive axis.

4. The cutterhead of claim 2, said housing including a wall defining a cup-like shape forming an enclosed space; said housing further having a hub formed on said wall coaxial to said drive axis and extending into said enclosed space; said adjusting member having an adjusting sleeve journalled on said hub so as to be movable relative to said hub and so as to be coaxial to said intermediate ring.

5. The cutterhead of claim 4, said housing wall including a base and a side wall extending upwardly from said base; said housing including a removable cover for covering over said enclosed space to define an enclosed chamber for accommodating said spool therein; said hub being formed on said base and extending upwardly therefrom and said intermediate ring being rotatably journalled on said hub near said base; and, said adjusting member having an upper adjusting part extending upwardly from said adjusting sleeve and having an end face adjacent said cover.

6. The cutterhead of claim 5, a supporting ring for axially bracing said adjusting member at said adjusting part thereof; and, a holding part for releasably holding said supporting member on said hub.

7. The cutterhead of claim 6, said supporting ring and said adjusting member being mutually engaged in a form-tight manner; and, said adjusting member being axially displaceable out of engagement with said supporting ring and along said hub against the force of said spring.

8. The cutterhead of claim 7, said supporting ring and said adjusting member having respective sets of interengaging teeth to define the form-tight engagement of said supporting ring and said adjusting member.

9. The cutterhead of claim 8, said supporting ring extending out from said axis in overlapping relationship to said adjusting member; and, said access means comprising at least one slot formed in said supporting ring; manipulating means formed on said adjusting member and at said slot so as to be accessible by an operator; and, scale means formed on said supporting ring next to said slot for indicating the setting of the biasing force of said spring.

10. The cutterhead of claim 9, said manipulating means and said adjusting member conjointly being a single piece with said manipulating means and being configured so as to extend upwardly through said slot.

11. The cutterhead of claim 4, said sleeve having an end portion facing toward said intermediate ring and having a recess formed in said end portion; and, a lug of a predetermined width formed on said hub so as to engage said recess; said recess having a width greater than said lug so as to permit limited rotational movement of said adjusting member relative to said hub.

12. The cutterhead of claim 9, said manipulating means comprising: recess means formed in said adjusting member directly beneath said slot; and, a separate adjusting key adapted to be manually held by an operator and having at least one prong formed thereon which can be passed through said slot to engage said recess means so as to permit the operator to axially displace and rotate said adjusting member to adjust the resilient biasing force applied by said spring to said intermediate ring.

13. The cutterhead of claim 2, said spool having a plurality of cams formed thereon; said housing having a wall defining an enclosure for accommodating said spool therein;

said coupling means including: two pivot lugs formed on said wall so as to extend into said enclosure; two coupling members pivotally mounted on said pivot lugs, respectively, with each of said coupling members being pivotal between said first and second positions in response to said predetermined centrifugal force; meshing means for transmitting said resilient biasing force to said coupling members and for meshing said coupling members with said intermediate ring whereby a pivotal displacement of one of said coupling members is synchronously transmitted to the other one of said coupling members; and, said coupling members having respective stops formed thereon for coacting with said cams such that one of said stops coacts with one of said cams when said coupling members are in said first position while the other one of said stops coacts with an other one of said cams when said coupling members are in said second position.

14. The cutterhead of claim 13, said intermediate ring having an outer periphery and said meshing means comprising: two recesses formed in said outer periphery; and, said coupling members having respective projections engaging corresponding ones of said recesses.

15. The cutterhead of claim 13, said coupling members both being biased against said centrifugal force exclusively by said spring.

* * * * *

UNITED STATES PATENT AND TRADEMARK OFFICE
CERTIFICATE OF CORRECTION

PATENT NO. : 4,866,846

DATED : September 19, 1989

INVENTOR(S) : Joachim Hoffmann, Josef Karner, Dieter Angstenberger and Gerhard Zerrer It is certified that error appears in the above-identified patent and that said Letters Patent is hereby corrected as shown below:

In column 2, line 20: insert -- with a -- between "equipped" and "cutterhead".

In column 2, line 22: insert -- cutterhead of -- between "the" and "FIG. 1;".

In column 2, line 25: insert -- section -- between "a" and "view".

In column 2, line 27: insert -- schematic -- between "a" and "plan".

UNITED STATES PATENT AND TRADEMARK OFFICE
CERTIFICATE OF CORRECTION

PATENT NO. : 4,866,846

DATED : September 19, 1989

INVENTOR(S) : Joachim Hoffmann, Josef Karner, Dieter Angstenberger and Gerhard Zerrer It is certified that error appears in the above-identified patent and that said Letters Patent is hereby corrected as shown below:

In column 2, line 29: insert -- section -- between "a" and "view".

In column 2, line 31: delete the period between "adjusting" and "and" and substitute -- ring -- therefor.

In column 2, line 36: insert -- removed -- between "cover" and "and".

In column 2, line 40: delete "o" and substitute -- of the -- therefor.

In column 2, line 42: insert -- for -- between "ready" and "operation.".

Signed and Sealed this

Twenty-fourth Day of July, 1990

Attest:

HARRY F. MANBECK, JR.

*Attesting Officer*  *Commissioner of Patents and Trademarks*